United States Patent [19]

Gillberg-La Force et al.

[11] Patent Number: 4,537,931
[45] Date of Patent: * Aug. 27, 1985

[54] FLOW-REGULATED LATEX SYSTEMS

[75] Inventors: Gunilla E. Gillberg-La Force, Summit; Helen A. Kravas, Chatham, both of N.J.

[73] Assignee: Celanese Corporation, New York, N.Y.

[*] Notice: The portion of the term of this patent subsequent to Nov. 15, 2000 has been disclaimed.

[21] Appl. No.: 550,844

[22] Filed: Nov. 14, 1983

[51] Int. Cl.$^3$ ............................ C08L 9/08; C08L 9/10
[52] U.S. Cl. ...................................... 524/510; 428/492
[58] Field of Search ............................... 524/501, 510

[56] References Cited

U.S. PATENT DOCUMENTS

| | | | |
|---|---|---|---|
| 3,855,168 | 12/1974 | Ozeki | 524/510 |
| 4,107,117 | 8/1978 | Lin | 524/510 |
| 4,128,520 | 12/1978 | Barabas | 524/501 |
| 4,148,963 | 4/1979 | Bourrain | 524/510 |
| 4,341,674 | 7/1982 | Vermilion | 524/510 |
| 4,405,746 | 9/1983 | Girgis | 524/510 |
| 4,415,701 | 11/1983 | Bauer | 528/361 |

OTHER PUBLICATIONS

Bennett, *Concise Chemical and Technical Dictionary*, 3rd Edition, p. 1042, Chemical Pub. Co., N.Y., 1974.
Sherman, *Emulsion Science*, pp. 217–221, Academic Press, London & New York, 1968.

*Primary Examiner*—C. Warren Ivy
*Attorney, Agent, or Firm*—Depaoli & O'Brien

[57] ABSTRACT

This invention provides flow-regulated adhesive latex formulations which exhibit unique shear-thinning properties for coating of substrates such as tire cord. The essential components of an invention aqueous adhesive composition for textile-rubber bonding consist of (1) an associative thickener, (2) a phenol-aldehyde resin; and (3) a latex of curable elastomer.

11 Claims, No Drawings

FLOW-REGULATED LATEX SYSTEMS

BACKGROUND OF THE INVENTION

The difficulty of bonding textile fibers to rubber is manifest in the great difference between the two types of surfaces, and the necessity for a bond to exceed the strength of both substrates. The bond must have the ability to resist extremes of temperature, compression loads, shock, creep and distortion.

Textile-to-rubber adhesives are utilized extensively in automobile tire manufacture for bonding tire cord and other textile components to the rubber carcass. Other significant applications for textile-to-rubber adhesives are in the production of rubber belts, hose, rubberized fabrics and rugs.

Latex dips are employed for coating of fibers such as nylon, rayon, polyester and glass to improve the adhesion of the fibers to rubber substrates.

In the use of the many dips that have been developed, it is preferred to pretreat fibers with adhesive resorcinol-formaldehyde resin(RF) dip, or with RF dips containing a preparation of elastomeric latex (RFL dips), or with epoxy dips, and to dry the coated fibers before assembling with another substrate (e.g., a vulcanizable elastomer) and curing the composite for the purpose of providing a bond between the substrates.

The various adhesive latex formulations employed as dips for fiber coating do not exhibit the most desirable rheological properties for effecting an efficient fiber coating operation. The viscosity properties are variable, and the control of flow parameters is difficult.

A variety of thickeners have been incorporated in latex formulations for flow-regulation, such as those described in U.S. Pat. No. 3,779,970 and U.S. Pat. No. 4,341,674. A typical thickener suffers from one or more shortcomings, such as incompatibility with other latex formulation components, too high a viscosity during application, sensitivity to pH or temperature conditions, or slow viscosity recovery after high shear conditions, and the like.

There is continuing interest in the development of novel adhesive latex formulations with improved properties for the coating of substrates such as fibers for textile-to-rubber bonding.

Accordingly, it is an object of this invention to provide a novel flow-regulated latex system.

It is another object of this invention to provide a shear-thinning aqueous adhesive composition adapted for improved textile-rubber bonding efficiency.

Other objects and advantages of the present invention shall become apparent from the accompanying description and examples.

DESCRIPTION OF THE INVENTION

One or more objects of the present invention are accomplished by the provision of a flow-regulated latex system comprising (1) an associative thickener, (2) a phenol-aldehyde resin; and (3) a rubber latex.

In one embodiment, the present invention provides a shear-thinning aqueous adhesive composition comprising (1) an associative nonionic polymeric surfactant; (2) a phenol-aldehyde resin; and (3) a rubber latex.

In another embodiment, the present invention provides a shear-thinning aqueous adhesive composition comprising (1) between about 0.1–25 weight percent of water-soluble associative polyether surfactant, based on the total weight of polymeric components; (2) water-soluble dihydric phenolaldehyde resin; and (3) a latex of curable elastomer.

In a further embodiment, the present invention provides an adhesive formulation adapted for textile-rubber bonding comprising a shear-thinning aqueous medium containing (1) between about 0.1–25 weight percent of an associative thickener which is a water-soluble copolymer of a dioxolane monomer and a $C_8$–$C_{36}$ monoepoxide monomer, based on the total weight of polymeric components; (2) between about 1–20 weight percent of a water-soluble resorcinol-formaldehyde resin, based on the formulation weight; and (3) between about 5–50 weight percent of curable colloidal elastomer, based on the formulation weight.

The indicated weight percent of polymeric components is on a dry weight basis.

The term "rubber" or "elastomer" refers to natural rubbers and the synthetic rubbers which are capable of being cured or vulcanized, as by the aid of heat and suitable vulcanizing agents. The vulcanizing agents may be of the sulfur type and/or of the free radical type, e.g., peroxide or hydroperoxide.

The term "fiber" refers to natural and synthetic fibrous materials, e.g., reinforcing material in the form of filament, yarn, cord, cable, ribbon, and cord fabric unwoven or woven as cloth or canvas to be used in reinforcing rubber articles such as vehicle tires, mechanical rubber goods such as belts, hose, gaskets, and the like, or as carrier sheet for adhesive material for interposition between other substrates to be bonded together thereby. Such fibrous materials may consist of cotton, cellulose acetate, organic esters and ethers of cellulose, rayon, polyesters such as ethylene glycol terephthalic acid polyesters (Fortrel), the polyvinyls and/or polyvinylidenes, such as the acrylonitrile polymers (Orlon), polyvinyl chloride and vinylidene chloride polymers (Vinyon), the polyethylenes and other polyolefins, the polyurethanes (Perluran), the proteins (Caslen), alginates, mineral fibers (fiberglass), polyamides, such as the aliphatic dicarboxylic acid-polyamide reaction products (nylon), or fully aromatic polyamides such as Kevlar, and combinations of two or more different fibers, e.g., in the same yarn or fabric.

Associative Thickener Component

An essential feature of the present invention flow-regulated latex systems is the presence of between about 0.1–25 weight percent, preferably 0.5–10 weight percent based on the total weight of polymeric components, of an associative thickener for imparting shear-thinning properties to the latex systems.

The term "associative thickener" refers to a polymer which is composed of a hydrophilic backbone and which has at least two hydrophobic side chains attached.

A preferred type of thickener component is an associative nonionic polymeric surfactant which is water-soluble or water-dispersible.

Illustrative of associative nonionic surfactants are those described in Journal of Polymer Science, Polymer Chemistry Edition, Volume 20, 443(1982). These water-soluble surfactants are prepared by the addition of long chain n-alkyl epoxides to nonionic cellulose ethers.

Other water-soluble surfactants which exhibit various degrees of associative thickening power in aqueous media include the polyoxyalkylene polymers described in U.S. Pat. Nos. 3,393,157; 4,288,639; 4,302,349; and 4,304,902.

An associative thickener polymer component of the present invention latex formulations generally will have a molecular weight in the range between about 5000–100,000, and usually in the range between about 10,000–50,000.

A type of associative thickener which has been found to impart exceptional shear-thinning properties to the present invention flow-regulated latex systems is that disclosed in patent application Ser. No. 434,144, filed Oct. 12, 1982 (now U.S. Pat. No. 4,415,701), incorporated herein by reference. This type of associative thickener is a water-soluble copolymer prepared by copolymerizing about 0.5–20 weight percent of a $C_{10}$–$C_{36}$ monoepoxide with about 80–99.5 weight percent of a 1,3-dioxolane.

An associative thickener is unique in comparison to other types of surfactants for the purposes of flow-regulation in a present invention latex system. Viscosity enhancement by an associative thickener is a two-fold effect.

The first effect is that characteristic of thickening agents in general with respect to aqueous media. The second effect is one that is peculiar to associative thickeners. This effect is attributable to a physical interaction between the hydrophobic side chains of the associative thickener molecules and the colloidal elastomer particles. The result of the interaction is a physical three-dimensional crosslinking of associative thickener molecules and colloidal elastomer particles.

The consequence of the two-fold viscosity enhancement is a latex system which exhibits an exceptional shear-thinning property. The latex system viscosity is extremely shear dependent, and decreases rapidly with shear. High viscosity is recovered within milliseconds after the cessation of high shear.

This unique rheology has particular advantage when a present invention adhesive latex formulation is employed as a latex dip for coating of tire cord. There is a low application viscosity during passage of the tire cord through the latex dip medium, and there is a rapid viscosity increase after the tire cord is withdrawn from the latex dip medium.

The rapid viscosity increase on the surface of the tire cord has two advantages. First, undesirable flow and dripping of the cord coating is avoided. Second, undesirable capillary flow of coating fluid into the cord interstices is prevented. These two advantages permit a high speed tire coating operation to yield tire cord with a uniform, continuous adhesive coating, and with a minimum waste of latex dip medium.

The term "shear-thinning" is defined as a monotonic function of shear-rate, in Elementary Rheology, page 33 (Academic Press, New York, 1969). An alternative term for shear-thinning is "structural viscosity".

PHENOL-ALDEHYDE RESIN COMPONENT

The phenol-aldehyde resin component of a present invention latex system usually is employed in a quantity between about 1–20 weight percent, based on the total weight of the formulation, and is either dissolved or dispersed in the latex medium.

A present invention phenol-aldehyde resin generally corresponds to a "phenoplast" resin as defined in the book entitled "Phenoplasts" (Interscience Publishers, New York, N.Y.). The term "Phenoplast" includes resins which are basic catalyzed reaction products of a phenol and an aldehyde (i.e., the resoles and resitols), and those resins which are acid catalyzed reaction products of a phenol and an aldehyde (e.g., the novolacs).

As recited in U.S. Pat. No. 4,255,486, suitable phenols to form phenol-aldehyde resins include phenol, dihydric phenols such as resorcinol, substituted phenols such as m-cresol, o-cresol, m-ethylphenol, m-n-propylphenol, m-isopropylphenol, m-n-hexylphenol, m-n-butylphenol, m-sec-butylphenol, m-tert-butylphenol, m-amylphenol, m-aminophenol, resorcinol monoacetate, 1,5-naphthalenediol, m-methoxyphenol, m-ethoxyphenol, m-n-propoxyphenol, bis(p-hydroxyphenyl)methane, 2,2-bis(p-hydroxyphenyl)propane, dihydroxydiphenyl sulfone, m-chlorophenol, m-bromophenol, and the like.

Aldehydes suitable for the formation of phenol-aldehyde resins include formaldehyde in any of its available forms (i.e., formalin, paraformaldehyde and trioxane), furfural, glyoxal, acrolein, and the like.

A phenol-aldehyde resin can be preformed and then blended with the other components of the latex system, or the phenol-aldehyde resin can be formed in an aqueous medium containing one or more of the other latex system components. Various methods of preparing phenol-aldehyde resins are outlined in references such as U.S. Pat. Nos. 3,956,205; 4,025,454; 4,314,050; 4,341,674; and 4,374,962.

In tire cord coating technology, the usual practice is to prepare an aqueous resin solution of about 5–15 percent solids, either by direct reaction of a phenol with an aldehyde or by reaction of a preformed, partially condensed phenol resin with additional aldehyde. In both cases an alkaline catalyst is employed. The solution is aged preferably for 1–4 hours, and then added to a rubber latex.

In a present invention latex system, the phenol-aldehyde resin can be a water-soluble condensate of the type conventionally used in tire cord coating compositions. Ordinarily such resins are produced by condensing about 0.2 to about 0.8 mole of formaldehyde with 1 mole of resorcinol. A small amount of additional formaldehyde can also be incorporated into the coating composition, preferably so that the final mole ratio of formaldehyde to resorcinol is greater than one. Suitable resorcinol-formaldehyde resins are SRF 1524 (Schenectady Chemical Co.), Penacolite R2170 and 2220 (Koppers Co.) and Arofene 779 (Ashland Chemical Co.).

RUBBER LATEX COMPONENT

The rubber latex component of a present invention flow-regulated aqueous adhesive formulation is employed in a quantity which provides between about 5–50 weight percent of colloidal elastomeric solids, based on the formulation weight.

Suitable elastomers include curable polymers such as natural rubber; polybutadiene, polyisoprene; polychloroprene; butadiene/acrylonitrile; butadiene/vinylpyridine; butadiene/styrene/vinylpyridine; butadiene/styrene; isobutylene/isoprene; and the like.

Illustrative of a commercial rubber latex is Gen-Tac (General Tire and Rubber Co.), which nominally is a vinylpyridine latex consisting of a copolymer of 70 percent butadiene, 15 percent styrene and 15 percent 2-vinylpyridine, with a total solids level of about 40 percent.

The rubber latex component of a present invention latex system can be added to a blend of associative thickener and phenol-aldehyde resin, or the rubber latex can be added to an aqueous medium containing the phenol and aldehyde reactants, with or without the presence of the associative thickener component.

TEXTILE-RUBBER BONDING

Significant developments in textile-rubber bonding technology are reviewed in literature such as Rubber Age, pages 69–73, September 1971; Rubber Chemistry and Technology, 42(1), 159(1969); and Handbook of Adhesives, Chapter 42, Reinholt, N.Y., 1962.

Illustrative of adhesive compositions of the present invention suitable for coating of tire cord substrates are the following flow-regulated latex formulations:

|  | Parts By Weight | |
| --- | --- | --- |
| Associative thickener | 2–10 | 2–10 |
| Preformed resorcinol-formaldehyde resin (75% total solids) | 31.5 | 37.5 |
| Aqueous sodium hydroxide solution (10%) | 9.5 | 11.0 |
| Water | 644.0 | 572.0 |
| Formaldehyde (37%) | 16.0 | 28.5 |
| Synthetic rubber latex (styrene-butadiene type), 40% | 239.0 | — |
| Vinylpyridine-styrene-butadiene terpolymer (40%) | 60.0 | 351.0 |
| Type cord | Rayon | Nylon |

The following Examples are further illustrative of the present invention. The specific ingredients and processing parameters are presented as being typical, and various modifications can be derived in view of the foregoing disclosure within the scope of the invention.

EXAMPLE I

This example illustrates the preparation of a standard resorcinol-formaldehyde-latex (RFL) adhesive composition.

The following ingredients are employed:

|  | Parts by wt. |
| --- | --- |
| Water | 331.0 |
| Resorcinol | 16.6 |
| Formaldehyde (37%) | 17.2 |
| Sodium hydroxide (50%) | 2.6 |
| Terpolymer rubber latex of styrene/butadiene/vinylpyridine 15/70/15 (41% solids) | 245.0 |

The adhesive composition is prepared by adding 16.6 parts of the resorcinol to 331 parts of water with stirring. After the resorcinol has dissolved, 17.2 parts of formaldehyde (37%) and 2.6 parts of 50% sodium hydroxide are added. The resulting mixture is stirred for one to two hours and then poured into 245 parts of latex solution with stirring. The solids content of the RFL adhesive composition is 20%.

The viscosity of the RFL adhesive is measured with a Brookfield spindle viscometer RVT at 25° C. (It has 8 speeds from 0.5–100 rpm and 7 different spindles covering a range of viscosities from 0–8,000,000 cps. The lower limit for effective measurements is near 85 cps.) The viscosity of the RFL resin is 10 cps and is shear independent.

EXAMPLE II

This example describes a method of synthesizing a preferred type of associative thickener, which is a copolymer of 1,3-dioxolane and 1,2-epoxyalkane.

The dioxolane is purified by stirring over lithium aluminum hydride until hydrogen evolution ceases, followed by distilling. The 1,2-epoxyalkane employed is Vikolox®16 (Viking Chemical Company), which is a 16 carbon atom monoepoxide having a molecular weight of 240 and a melting point of 22° C. The Vikolox® is used as received. The initiator for the cationic copolymerization, $BF_3$ in the form of the etherate, is vacuum distilled and a center cut is utilized. The polymerization is performed in glass pressure tubes, which first are washed with a basic solution, rinsed and dried.

134 ml dioxolane and 7.5 g of Vikolox®16 (5% w/w) are added to three tubes under argon, followed by the injection of 0.2 ml of $BF_3$ etherate into each tube. The tubes are sealed and immersed in an oil bath (60° C.), and the tubes are rotated in the oil bath for 17.5 hours.

The tubes are then dipped in liquid nitrogen to freeze the polymer. The tubes are cracked open, and the solid polymer contents of the tubes are combined. The solid polymer is admixed in a blender with two liters of methanol containing two grams of sodium hydroxide, and the solid polymer pieces are reduced in size by using the blender in the chop mode for 20 minutes. The polymer is filtered off, and then recharged to the blender with two liters of water containing two grams of sodium hydroxide. The mixture is stirred until a fine emulsion is achieved. A lower gel phase containing most of the polymer settles out after standing overnight. The upper water phase is decanted off, yielding a polymeric gel phase with an 11% solids content.

The viscosity of a 1% solution of the polymer is 7.0 cps, and that of a 5% solution is 16,400 cps. The viscosity is shear independent over a range of shear rates. The average molecular weight is determined from I.V. measurement in methylene chloride at 25° C. The measured average molecular weight is 28,000.

EXAMPLE III

This example describes the preparation of a flow-regulated adhesive formulation in accordance with the present invention.

An 11.3 gram quantity of the polymer gel thickener of Example II (11% solids) is added to 55.2 grams of water, and stirred at low heat until a homogeneous solution has been obtained. Successively, each of 3.32 grams of resorcinol, 3.43 grams of formaldehyde and 0.52 gram of 50% sodium hydroxide is added to the solution and stirred until a homogeneous solution results. The solution is stirred for another hour, and then slowly added to 49.0 grams of the terpolymer rubber latex (41% solids) described in Example I. The resulting adhesive formulation contains 20% w/w RFL solids and 1% associative thickener. The viscosity is measured with a Brookfield RVT viscometer using standard spindles #3 and #5. The following results are observed as a function of rotational speed:

| Spindle | RPM | CPS |
| --- | --- | --- |
| #3 | 50 | 838 |
|  | 20 | 1450 |
|  | 10 | 2350 |
|  | 5 | 3700 |
| #5 | 20 | 1600 |
|  | 10 | 2500 |
|  | 5 | 4000 |

The viscosity measurements indicate that the adhesive formulation is strongly shear-thinning. The high rest viscosity is restored very quickly, and there is no indication of a hysteresis-loop which typically is observed for thixotropic systems when viscosities are measured with a Rheomat viscometer.

EXAMPLE IV

This example describes the effect of adding an associative thickener to a rubber latex without the presence of a phenol-aldehyde resin.

An 11.3 gram quantity of the 11% associative thickener gel of Example II is dissolved in 61.95 grams of water, and then 0.52 gram of 50% sodium hydroxide is added. The resultant solution is added with stirring to 49.0 grams of the 41% terpolymer rubber latex described in Example I. The final solution concentration of the associative thickener is 1%. The viscosity measured with a Brookfield RVT viscometer is as follows:

| Spindle | RPM | CPS |
|---|---|---|
| #4 | 20 | 4300 |
|  | 10 | 6200 |
|  | 5 | 9000 |
|  | 2.5 | 12,400 |
| #5 | 20 | 4200 |
|  | 10 | 6000 |
|  | 5 | 8800 |
|  | 2.5 | 12,800 |

The rubber latex with 1% associative thickener exhibits strong shear-thinning, but no thixotropy. The viscosity at 0.1 sec$^{-1}$ shear rate is 42,000 cps.

EXAMPLE V

An associative thickener is synthesized in accordance with the procedure of Example II, except that the 1,2-epoxyalkane is Vikolox ®20-24. The total reaction time in the 60° C. oil bath is about two hours. The frozen and crushed polymer is charged to the blender with 500 ml methanol containing 5 ml of tributylamine and 0.2 gram of sodium hydroxide, and ground into fine powder. The powder is filtered off and dried in a vacuum oven overnight at room temperature and 30 mm Hg. The viscosity of a 1% solution is 1 cps, and that of a 5% solution is 100 cps.

EXAMPLE VI

The associative thickener of Example V is added to a RFL adhesive composition in accordance with the procedure described in Example III. The resultant adhesive formulation contains 1% associative thickener and 20% RFL solids. The viscosity is measured with a Brookfield RVT viscometer as follows:

| Spindle | RPM | CPS |
|---|---|---|
| #3 | 50 | 260 |
|  | 20 | 400 |
|  | 10 | 550 |
|  | 5 | 900 |
| #2 | 50 | 264 |
|  | 20 | 380 |
|  | 10 | 600 |
|  | 5 | 1000 |

The flow-regulated adhesive formulation exhibits strong shear thinning properties.

EXAMPLE VII

This Example illustrates a further process embodiment for synthesizing an associative thickener, which is a copolymer of 95% dioxolane and 5% 1,2-epoxyalkane.

Freshly distilled dioxolane (134 ml) and Vikolox ®16 (7.5 g) are charged under argon to a reactor consisting of a 500 ml three-necked flask equipped with a mechanical stirrer, an inlet tube for argon gas, a tube covered by a rubber septum for initiator injection, a thermometer and a condenser equipped with a drying tube. The reactor is placed in a 70° C. oil bath, and 2 ml of an initiator solution consisting of 1 ml of freshly distilled BF$_3$ etherate and 9 ml dry toluene is injected into the heated solution of dioxolane and Vikolox ®16.

After a reaction period of 2.5 hours at 70° C., the solution of formed polymer is diluted with water to provide a 35% solids solution. The pH of the solution is adjusted to 10 by the addition of 10% aqueous potassium hydroxide. The solution is stirred overnight with a resultant formation of a clear gel. The viscosity of a 5% solution is 1700 cps.

This associative thickener is added to an RFL adhesive in the manner described in Example III to a final solids concentration of 1%. The viscosity is measured with a Brookfield RTV viscometer.

| Spindle | RPM | CPS |
|---|---|---|
| #4 | 10 | 1300 |
|  | 5 | 2000 |
|  | 2.5 | 3200 |
| #5 | 10 | 1400 |
|  | 5 | 2000 |
|  | 2.5 | 3200 |

What is claimed is:

1. A shear-thinning aqueous adhesive composition comprising (1) between about 0.1-25 weight percent of water-soluble associative polyether surfactant, based on the total weight of polymeric components, wherein the associative polyether surfactant is a polymer consisting of a hydrophilic polyoxyalkylene backbone with at least two pendant hydrophobic side chains; (2) water-soluble dihydric phenol-aldehyde resin; and (3) a latex of curable elastomer.

2. A shear-thinning aqueous adhesive composition in accordance with claim 1 wherein the surfactant is a copolymer prepared by copolymerizing a 1,3-dioxolane with a C$_8$-C$_{36}$ monoepoxide.

3. A shear-thinning aqueous adhesive composition in accordance with claim 1 wherein the latex component comprises an aqueous dispersion of a butadiene-containing elastomer.

4. A shear-thinning aqueous adhesive composition in accordance with claim 1 wherein the latex component comprises an aqueous dispersion of a vinylpyridine-containing elastomer.

5. An adhesive formulation adapted for textile-rubber bonding comprising a shear-thinning aqueous medium containing (1) between about 0.1-25 weight percent of an associative thickener which is a water-soluble copolymer of a 1,3-dioxolane monomer and a C$_8$-C$_{36}$ monoepoxide monomer, based on the total weight of polymeric components; (2) between about 1-20 weight percent of a water-soluble resorcinol-formaldehyde resin, based on the formulation weight; and (3) between about 5–50 weight percent of curable colloidal elastomer, based on the formulation weight.

6. An adhesive formulation in accordance with claim 5 wherein the elastomer component is a styrene-butadiene copolymer.

7. An adhesive formulation in accordance with claim 5 wherein the elastomer component is a vinylpyridine-styrene-butadiene copolymer.

8. An adhesive formulation in accordance with claim 5 wherein the elastomer component is a mixture of styrene-butadiene and vinylpyridine-styrene-butadiene copolymers.

9. An adhesive formulation in accordance with claim 5 wherein the pH of the formulation is in the alkaline range.

10. An adhesive formulation in accordance with claim 9 wherein the alkalinity is provided by an alkali metal hydroxide.

11. An adhesive formulation in accordance with claim 9 wherein the alkalinity is provided by sodium hydroxide and ammonium hydroxide.

* * * * *